(12) United States Patent
Oster et al.

(10) Patent No.: US 7,945,818 B2
(45) Date of Patent: May 17, 2011

(54) METHOD AND APPARATUS FOR CONVERTING MULTICHANNEL MESSAGES INTO A SINGLE-CHANNEL SAFE MESSAGE

(75) Inventors: Viktor Oster, Blomberg (DE); Heinz-Carsten Landwehr, Lemgo (DE); Joachim Schmidt, Horn-Bad Meinberg (DE)

(73) Assignee: Phoenix Contact GmbH & Co. KG (DE)

( * ) Notice: Subject to any disclaimer, the term of this patent is extended or adjusted under 35 U.S.C. 154(b) by 675 days.

(21) Appl. No.: 11/624,500

(22) Filed: Jan. 18, 2007

(65) Prior Publication Data
US 2007/0180286 A1    Aug. 2, 2007

(30) Foreign Application Priority Data
Jan. 19, 2006   (DE) .......................... 10 2006 002 824

(51) Int. Cl.
*G06F 11/00* (2006.01)
(52) U.S. Cl. ......................................... 714/48; 711/154
(58) Field of Classification Search .................. 714/4, 12, 714/47–49; 700/21, 79; 711/154
See application file for complete search history.

(56) References Cited

U.S. PATENT DOCUMENTS

| | | | | |
|---|---|---|---|---|
| 4,967,347 A | * | 10/1990 | Smith et al. ...................... | 714/12 |
| 5,452,443 A | * | 9/1995 | Oyamada et al. ................ | 714/10 |
| 5,689,632 A | | 11/1997 | Galy et al. | |
| 6,161,202 A | * | 12/2000 | Kuntzsch et al. ................ | 714/51 |
| 6,161,208 A | * | 12/2000 | Dutton et al. ................... | 714/764 |
| 6,356,813 B1 | * | 3/2002 | Sommer et al. .................... | 701/1 |
| 6,611,722 B2 | * | 8/2003 | Behr et al. .......................... | 700/3 |
| 6,711,713 B1 | * | 3/2004 | Rumpler et al. .............. | 714/820 |
| 6,732,300 B1 | * | 5/2004 | Freydel ........................... | 714/36 |
| 6,823,251 B1 | * | 11/2004 | Giers ............................... | 701/76 |
| 6,832,343 B2 | * | 12/2004 | Rupp et al. .................... | 714/47.1 |

(Continued)

FOREIGN PATENT DOCUMENTS

DE    2835095 A1    3/1979

(Continued)

OTHER PUBLICATIONS

H. Dupuis, "EP Patent Application EP 07 00 0939 Search Report", May 16, 2008, Published in: EP.

(Continued)

*Primary Examiner* — Robert Beausoliel
*Assistant Examiner* — Elmira Mehrmanesh
(74) *Attorney, Agent, or Firm* — DeMont & Breyer LLC (57) ABSTRACT

A method and an apparatus are disclosed for the coupling of a safety-critical process from a safe environment to an environment that is not safe or to an environment that is safe but has fewer processing channels. To this end, provision is made of a method which processes a data record that is relevant to the safety-critical process to form a respective safe protocol using at least two redundant processing channels in accordance with identical laws, and forms a common safe protocol taking into account at least two redundant safe coupling protocols. When writing at least elements of the common safety-based protocol using a processing channel with write authorization, another processing channel is used to check whether these elements are identical to one another. Access to a common buffer register for the purpose of storing these elements is enabled only when they are identical to one another.

28 Claims, 4 Drawing Sheets

U.S. PATENT DOCUMENTS

| | | | |
|---|---|---|---|
| 7,120,505 B2 * | 10/2006 | Nakamura et al. | 700/3 |
| 7,562,261 B2 * | 7/2009 | Meyer-Grafe et al. | 714/48 |
| 2004/0199837 A1 * | 10/2004 | Meyer-Grafe et al. | 714/712 |
| 2006/0229737 A1 * | 10/2006 | Esch et al. | 700/1 |

FOREIGN PATENT DOCUMENTS

| | | | |
|---|---|---|---|
| DE | 4444688 A1 | 6/1996 | |
| DE | 19532639 C2 | 2/1997 | |
| DE | 10065907 A1 | 9/2002 | |
| DE | 102004039932 A1 | 3/2006 | |
| EP | 0 201 356 B1 | 10/1992 | |
| EP | 0747803 A2 | 12/1996 | |
| EP | 1 631 014 A2 | 3/2006 | |

OTHER PUBLICATIONS

Hans Joachim Gerstein, "DE Application No. DE 10 2006 002 824 B4 Opposition", Dec. 22, 2008, Published in: DE.

Jing Zhijun, "Office Action for Application No. 200710128831.7", Jan. 29, 2010, Publisher: Chinese Patent Office, Published in: China.

Profibus Working Group, Safety Profile, (WG5) Within the Technical Committee for Application Profiles (TC3), "PROFIsafe—Profile for Safety Technology, Version 1.20, Oct. 2002", "Profibus Profile— Order No. 3.092", Oct. 18, 2002, Publisher: Profibus Nutzerorganisation e. V., Published in: Karlsruhe, Germany.

* cited by examiner

METHOD AND APPARATUS FOR CONVERTING MULTICHANNEL MESSAGES INTO A SINGLE-CHANNEL SAFE MESSAGE

FIELD OF THE INVENTION

The invention relates to a method and to an apparatus, which has been adapted to carry out the method, for the coupling of safety-relevant processes from a safe multichannel environment to an environment which is not safe and/or has fewer channels, in particular for the single-channel bus coupling of safety-relevant processes.

BACKGROUND OF THE INVENTION

In the following text, the expression "safety-relevant or safety-critical process" means a process which, when an error occurs, results in a risk to people and/or also material goods which cannot be ignored. In a safety-relevant process, it is therefore necessary to ensure, with 100% confidence in the ideal case, that, when an error is present, this process, a subsequent process that is coupled to this process, and/or an overall system which includes this process is/are changed to a safe state. Such safety-relevant processes may thus also be subprocesses of larger, higher-level overall processes. Examples of safety-relevant processes are chemical processes in which it is absolutely necessary to keep critical parameters in a predetermined range, complex machine control systems, for example for a hydraulic press or a production line, in which, by way of example, the starting-up of a pressing/cutting tool may represent a safety-relevant subprocess. Further examples of safety-relevant (sub)processes are the monitoring of protective guards, protective doors or light barriers, the control of two-handed-operation switches or else the reaction to emergency stop switches.

It is thus absolutely essential, for all safety-relevant processes, that the respectively associated safety-relevant data which are produced, recorded or measured are transported in real time without any corruption, since any corruption can result in an incorrect operation and/or reaction which, in the end, may endanger people's lives and health.

In order to comply with the safety regulations, numerous agreements which require virtually error-free data transport when using bus systems have been reached in recent years. These agreements relate, in particular, to the data transport itself and to a permissible residual error probability as a function of the respective application and/or the respective process. Relevant standards which may be quoted in this case include, in particular, EN 61508 and EN 954-1, as well as the principles for the testing and certification of "bus systems for the transmission of safety-relevant messages" produced by the test and certification center of the industrial professional associations.

Safety-based bus systems which transmit data with a high level of redundancy have been developed in accordance with these agreements and standards. Possible errors are discovered in good time, and any risk can be avoided. Examples of these include, inter alia, the Safety Bus P, Profibus F, Interbus Safety etc.

However, one disadvantage in this case is that bus systems which have already been installed must be replaced in order to use safety-based bus systems, and it is frequently necessary to accept restrictions to the number of subscribers, to the data transport rate or to the data protocol.

As a result, safety-based methods and/or components which make it possible to retrofit already existing bus systems in a simpler and more cost-effective manner have been developed. In particular, electronic safety methods which are used in control and automation technology in this case use the (field) bus systems, which are already used for data communication between the individual units involved in a process, for the purpose of transmitting safety-relevant data, in particular between sensors, actuators and/or control devices.

By way of example, EP 1 188 096 B1 discloses a control system for a safety-relevant process with a field bus which is used to connect a control unit for controlling the safety-relevant process and a signal unit which is linked to the safety-relevant process via I/O channels. In order to ensure failsafe communication with one another, these units have safety-related devices which are intended to be used to make units that are not safe become safe units. Specifically, at least two redundant processing channels are respectively provided in such a manner that an error in one of the processing channels can be identified and possibly corrected on the basis of a result which differs from that of another of the redundant processing channels. This multichannel structure is realized, in particular, using two redundant computers, with the safety analysis ending after the two redundant computers and the analysis being used for a safe data protocol from this point on, without any further statements.

In the following text, the general term computer should essentially be understood as meaning any type of data processing devices, such as microcomputers, microprocessors, microcontrollers or else PCs, which comprise software and/or hardware.

Figure 3:
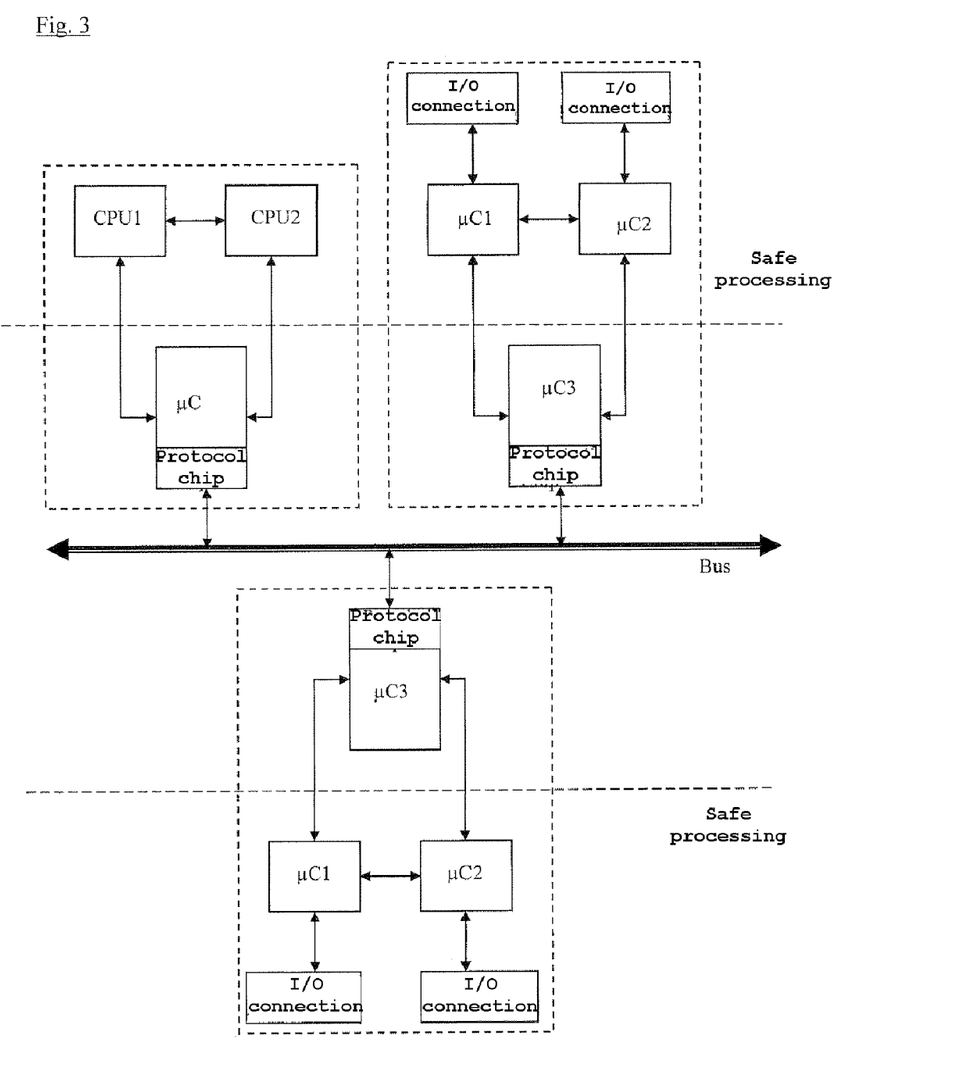
FIGS. 3 and 4 show known implementations for the change from the two-channel form to the single-channel form.

WO 01/15385 A2 also relates to the control of safety-relevant processes using (field) bus systems, with the units which are involved in the control of the safety-relevant process once again generally having redundant processing channels. Each of the redundant channels comprises a computer, and the computers monitor one another. This multichannel structure is changed to a single-channel structure by means of a further computer which is connected to the field bus (FIG. 3). The document does not contain any more far-reaching statements, including the change from the multichannel form to the single-channel form.

WO 01/15391 A1 and the laid-open specification DE 199 39 567 A1 contain further examples of safe bus subscribers with redundant processing channels, and/or computers, which monitor one another for safe protocol creation, and a subsequent change from the two-channel form to the single-channel form via a further computer which is coupled to the bus, is connected to a protocol chip or has the latter integrated in it. In this case as well, the safety analysis ends without the disclosure of further technical measures based on the two redundant computers, and the analysis is used for a safe data protocol from this point on.

Figure 4:
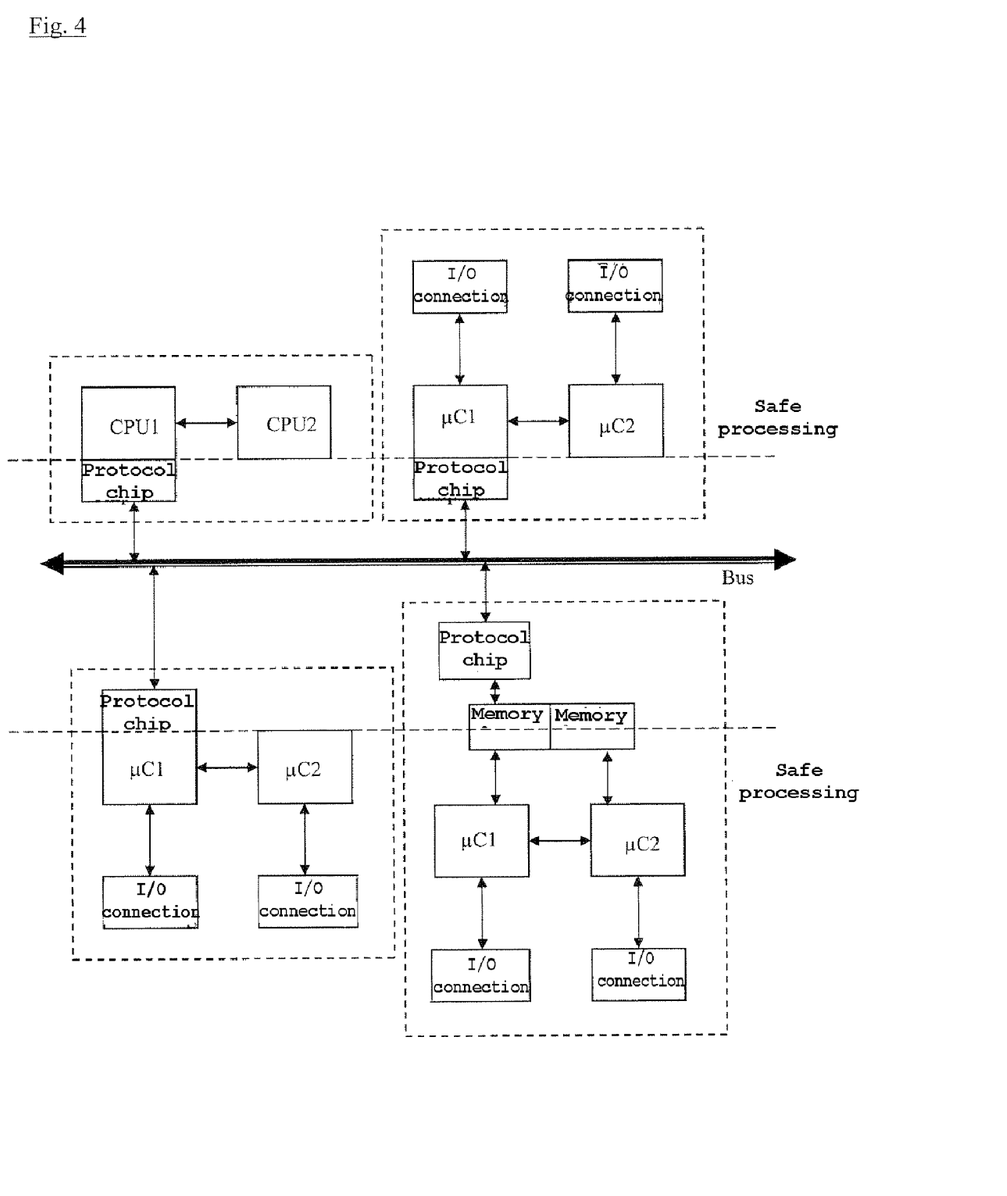

Patent Specification DE 195 32 639 C2, which relates to a device for the single-channel transmission of data which have been formed using two redundant computers, integrates the function of bus coupling into one of the two redundant computers in order to reduce the circuit complexity. Only that computer which has the bus coupling functionality thus has an output channel, to which useful data originating from this computer and test data originating from the other computer are supplied, or vice versa, or useful data and test data from both computers are supplied in such a manner that they are interleaved in one another (FIG. 4). However, in order to ensure that the computer which is controlling the bus is not able to generate messages which the other computer cannot influence, the implementation of the safety analysis requires increased complexity since, on the one hand, the freedom from reactions and, on the other hand, the independence of the computers for creation of the safe protocol must be verified.

In this context, the patent specification proposes only appropriate connection and non-connection of the respective computer outputs.

Furthermore, DE 100 65 907 A1 describes a method, based on the principle of "redundancy with cross-over comparison", for safe data transport for data transmission in parallel or serial networks or bus systems, in which a buffer register with two logically identical data areas for changing from the two-channel form to the single-channel form is used. The complete, safety-based message to be transmitted on one channel via the bus system includes the data contents of both data areas of the buffer register (FIG. 4). Two redundant computers are in turn connected upstream of the buffer register at the transmitter end and, depending on the type of application, respectively preprocess safety-relevant data, which is provided on one channel or two channels, with redundant information to form safe data, which they interchange with one another for checking. If both arrive at the same result, each of the computers transfers its safe data to the buffer register, with each data area being filled with the safe data from a respective computer, which data itself already contain redundant information for error identification. If, in an alternative embodiment, the buffer register is contained in one of the two computers, such that this one computer in consequence appropriately fills both data areas of the buffer register after agreement with the second computer, this second computer reads out the buffer register with the two data areas once again, for monitoring purposes. Depending on the application, the data content of one of the two data areas of the buffer register may also have inverted data or other additional interleaving in order, for example, to identify systematic faults in the transmitters, receivers and/or other units which forward the data. This therefore has the particular disadvantage that the overall data length of the safety-based message is extremely large with respect to the actual useful data, and the data transmission rate for the actual useful data is thus low, since two identical useful data records as well as a respective redundant item of information for each of the identical useful data records have to be transmitted for each useful data record to be transmitted. If the number of useful data items to be transmitted per data packet decreases, as is the case by way of example with the Interbus, the ratio of the useful data length to the overall data length becomes increasingly worse.

German patent application 10 2004 039 932.8 by the same applicant, as regards which the present invention constitutes a further development, was based on the object of providing a further, new and improved approach for the change from the multichannel form to the single-channel form for the safe bus coupling of safety-relevant processes, and to ensure, in a manner that is simple to implement, in particular additionally in a manner which is simple to test, freedom from reactions and independence when creating a safety-based protocol which is intended to be transmitted as a safety message via a bus.

To this end, it was proposed to provide a method for the single-channel bus coupling of a safety-critical process, in which a data record which is relevant to the safety-critical process is processed, in particular on a protocol-specific basis, to form a respective safety-based protocol using at least two redundant processing channels in accordance with identical laws, and the redundant safety-based protocols for single-channel bus coupling are again joined together to form a common safety-based protocol, to be precise in that each of the processing channels accesses a common buffer register, with write authorization for each register location being allocated only once, in such a way that the common safety-based protocol, i.e. the safety message to be transmitted, is joined together, in the buffer register, by necessarily writing in respective different elements of the respective safety-based protocols.

Consequently, one major advantage in this case was that, on the one hand, both processing channels are able to calculate the complete safety-based protocol in such a way that it has a positive effect on the required message length, since all of the data bits are already known, with the various safety mechanisms, in the redundant processing channels, and no additional data bits need to be transmitted to allow the deduction of the correct calculation at the receiver end. Furthermore, this ensures that one processing channel on its own is not able to send a safety message, with the control by means of the write authorization, which can respectively be allocated only once, for data in a registered location representing a capability which is simple to implement and is highly efficient for ensuring cost-effective, considerably better safety, independently of the bus (system) used.

The implementation of an intelligent unit for carrying out the method could thus be ensured just by the use of an apparatus which comprises at least two redundant computers and in which the computers are designed to process an identical input data record, to form a respective safety-based protocol, using identical laws and are connected, via a circuit arrangement, to a common buffer register in such a manner that write access is given to each computer for particular respective register locations and write access is given to only a respective one of the computers for each register location in the buffer register.

Just by the use of standard components and independently of the respective bus system, the invention disclosed in German patent application 10 2004 039 932.8 thus allowed a highly dynamic and highly efficient solution, which is simple to implement, for the reaction-free and independent formation of a respective safety-based protocol.

SUMMARY OF THE INVENTION

However, since the safety-based protocol to be transmitted is thus first of all necessarily generated in the memory, a further, additional increase in safety can be ensured either by first of all using the processing channels to check whether the redundantly formed safety-based protocols are identical to one another before the common safety-based protocol is written, with the result that a common safety-based protocol is formed only in response to identical safety-based protocols which have been processed independently of one another from an identical input data record, or by each of the redundant processing channels accessing each register location, with read-back, after the common safety-based protocol has been written in but before the latter is transferred from the buffer register to a bus, for example, in order to verify the jointly formed safety-based protocol.

One object of the present invention is now to further develop the solution described in German patent application 10 2004 039 932.8 in such a manner that the coupling process when writing the safety-based protocol into a common memory or protocol chip using the safe redundant processing channels is concluded in a more rapid manner, whilst retaining this increased safety, and can also be used in memory or protocol chips in which it is not possible to read back data which have been written in.

For the coupling of at least one safety-critical process from a safe environment, which has a plurality of redundant processing channels, to an environment which is not safe or to an environment which is safe but has fewer processing channels, the invention thus provides a method in which a data record which is relevant to the safety-critical process is processed, in particular on a protocol-specific basis, to form a respective safety-based protocol using the at least two redundant processing channels in accordance with identical laws, and a common safety-based protocol is formed taking into account at least two redundant safety-based coupling protocols, to be precise by accessing a common (buffer) register using each of the processing channels, in which case a write authorization is allocated only once for each register location, and, when writing at least elements of the common safety-based protocol using a processing channel with write authorization, by first of all using at least one further processing channel to check whether these elements are identical to one another, and enabling access to the common register for the purpose of storing these elements only when they are identical to one another.

Consequently, one major advantage in this case is also that, on the one hand, both processing channels are able to calculate the complete safety-based protocol in such a way that it has a positive effect on the required message length, since all of the data bits are already known, with the various safety mechanisms, in the redundant processing channels, and no additional data bits need to be transmitted to allow the deduction of the correct calculation at the receiver end. Furthermore, this ensures that one processing channel on its own is not able to send a safety message, with the control by means of the write authorization, which can respectively be allocated only once, for data in a registered location representing a capability which is simple to implement and is highly efficient for ensuring cost-effective, considerably better safety, independently of the bus (system) used. Further major advantages are also that the method according to the invention is faster as regards the coupling process because the data to be written in are verified, and the respective safe protocol data which have been redundantly processed are compared to ensure that they are identical to one another, immediately when a data item or a plurality of data items is/are being written to the register. The invention can therefore also be applied to registers and memories which do not enable readback.

The implementation of an intelligent unit for carrying out the method according to the invention can thus be ensured just by the use of an apparatus which comprises at least two redundant computers and in which the computers are designed to process an identical input data record, to form a respective safety-based protocol, using identical laws and are connected, via a circuit arrangement, to a common (buffer) register in such a manner that initiation of write access is given to only a respective one of the computers for each register location in the register, and access to the common register for the purpose of storing the elements to be written in is locked until the elements to be written in have been verified by at least another one of the computers.

Just by the use of standard components and independently of the respective bus system, the invention thus allows a highly dynamic and highly efficient solution, which is simple to implement, for the reaction-free and independent formation of a respective safety-based protocol and for checking the safety-relevant data during the write operation itself immediately before said data are entered in the memory or register chip.

The specific processing rules for forming the safety message are in this case more expediently suitable for satisfying the respective safety requirements, in particular the safety requirements for a single transmission in accordance with SIL 3 IEC 61508.

The respective write authorizations and verification duties are preferably defined and allocated by prescribing specific master and/or slave functionalities, in which case these functionalities can preferably also be changed and/or are changed in accordance with particular cycles. The use of a common address bus and a common data bus is also provided for an implementation which is simple in practice.

During the write operation, the respective protocol elements which are to be written into at least one register location can thus be transferred to the data bus using that processing channel which has the corresponding write authorization and can be read from said data bus using the at least one further processing channel for the purpose of verification.

For example, the computer of the first processing channel acts as a master for one or more particular register locations and places the appropriate safe data, which have been calculated by it, onto the data bus, in which case an enable for the purpose of storage in the memory chip is still locked. The computer of the second processing channel acts as a slave and checks the data which have been placed onto the data bus using its own calculated safe data. The computer which is carrying out the check provides the enable for the purpose of storage in the memory chip only when the check has revealed that the data match.

At least the outputting of an enable signal by the computer which is carrying out the check is thus expediently provided for the purpose of enabling a write signal, that is to say for canceling the access lock, in order to store the data, which are to be written in, in the memory chip.

The requirement for an enable signal from the computer which is writing, at least after the protocol elements have been transferred to the data bus, for the purpose of enabling a write signal is preferably also provided.

In order to prescribe a respective register location for which protocol elements currently need to be respectively written in, it has proven expedient to transfer the corresponding address to the common address bus.

Depending on the master/slave functionalities which have been allocated, an address for determining a register location is transferred using the same processing channel or different processing channels, and protocol elements for this register location are written using the same processing channel or different processing channels.

A watchdog component which is connected to the processing channels and/or computers and to the buffer register is also preferably included for the purpose of monitoring the function of the processing channels and/or computers.

The requirement for an enable signal from the watchdog component for enabling access to the common buffer register for the purpose of storing elements to be written in is also preferred. If said enable signal is not present, for example in the event of a computer failing or in the event of an error in a computer, a complete safety message consequently cannot be generated either, with the result that an error is inevitably identified and a safety-based function can be triggered. Test procedures can thus also be carried out in a manner which is simple in practice.

The computers which are uncoupled from one another per se are also preferably connected to one another using a communication interface, in particular for synchronization between the computers.

According to one embodiment, a computer respectively comprises an integrated protocol chip, in particular in order to ensure, after the input data have respectively been processed on a protocol-specific basis to form a safety-based protocol, that said data are stored and transferred to the bus on a protocol-specific basis, the safety-based protocol satisfying the requirements which are based on the respective application, in particular as a function of the bus and/or the processes, and are imposed on a safe protocol data record. In an alternative design, the protocol chip may also be connected, on the output side, to a computer. In order to avoid such integrated or downstream protocol chips and consequently also to reduce the number of components and the costs, a further, particularly expedient embodiment proposes providing the computer with software which is appropriately designed to process and transfer the data on a protocol-specific basis.

The apparatus according to the invention may be in the form of a bus subscriber unit, in which case, for this purpose, the computers are expediently connected, on the input side, at least to input channels for the single-channel or multichannel connection of process data input units and accordingly for the single-channel or multichannel detection of safety-relevant input data to be processed, or is in the form of a bus control unit which, for example, generates the safety-relevant input data to be processed. The computers are thus in the form of microcontrollers or central processing units (CPUs), in particular.

In one preferred embodiment, the circuit arrangement for inventively connecting the computers or possibly the protocol chips which are connected downstream of the computers is in the form of a simple logic circuit, in which case large-scale integrated circuits, for example in the form of an FPGA (Field Programmable Gate Array), may also be used and may be additionally advantageous on an application-specific basis.

The buffer register has an interface which can be used to directly couple the common safety-based protocol, which is stored there, into the bus, for example an Interbus, on one channel or to transfer said protocol, on one channel, to a further application-specific bus coupling device which is connected upstream of the bus, with a further protocol chip, a further microcontroller or another intelligent unit being able to be used, in particular, as the bus coupling device on an application-specific basis.

Even a standard RAM is thus sufficient as the buffer register. However, a preferred development provides, in particular, for the buffer register or the buffer memory to be in the form of a dual-port memory (DPM), so that the computers can be connected in the most simple and cost-effective manner using one of the two interface ports, and the single-channel coupling to the bus can be effected using the second interface port. In a particularly expedient manner, the invention also makes it possible to use memory chips which are hostile to read-back, for example a serial register expansion chip.

BRIEF DESCRIPTION OF THE DRAWINGS

Further features and advantages of the invention will become evident from the following detailed description of one preferred, but merely exemplary embodiment of the invention with reference to the attached drawings, in which.

DETAILED DESCRIPTION

Figure 1:
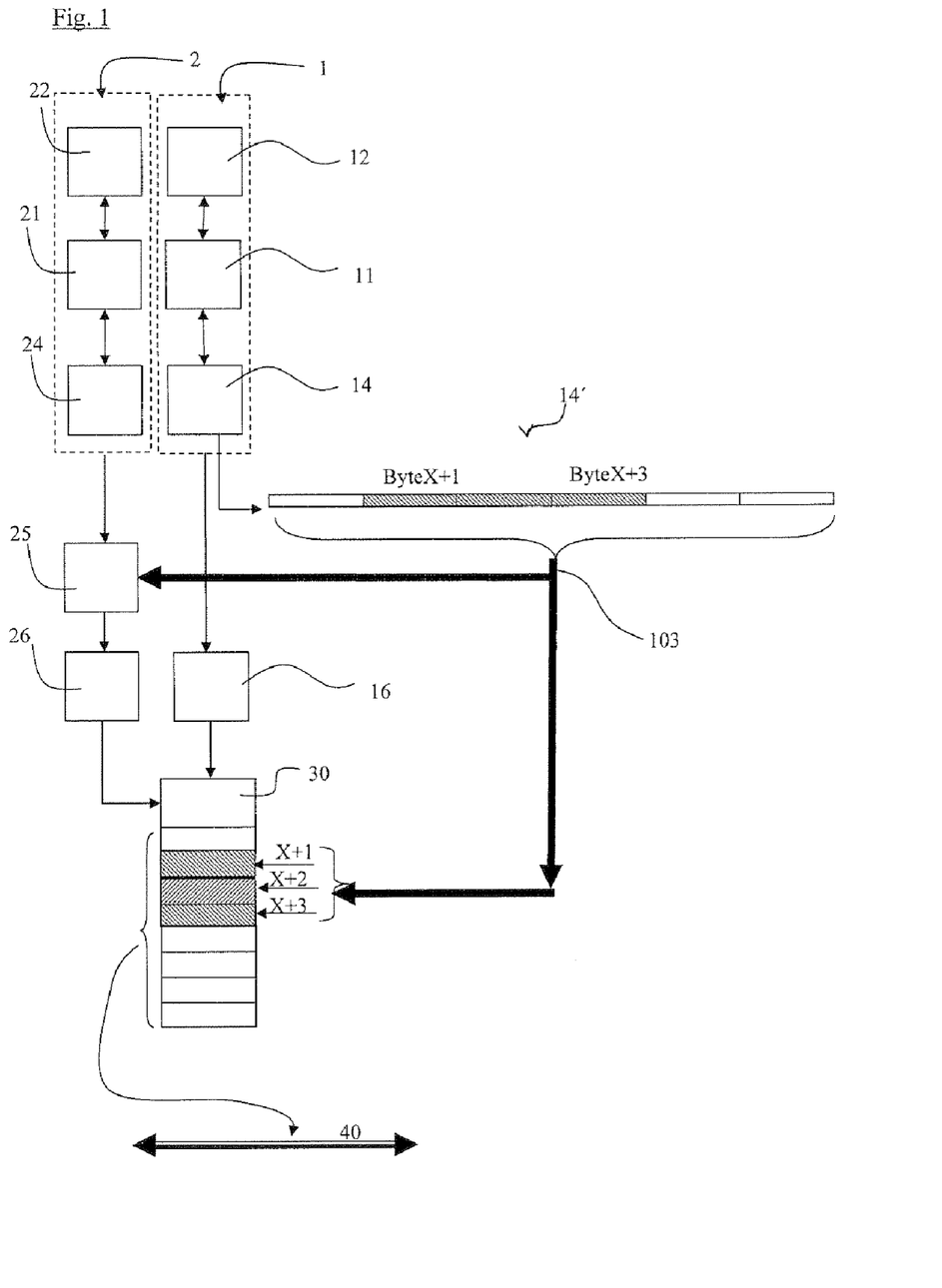
FIG. 1 shows a schematic outline sketch for the redundant formation of safety-based protocols for a safety message to be transmitted by means of redundant processing channels, and subsequent formation of a common identical safety-based protocol taking into account all of the redundant safety-based protocols and under the control of a write and verification rule relating to the elements which are to be respectively transferred/accepted from the safety-based protocols.

FIG. 1 illustrates two redundant processing channels 1 and 2 of a bus subscriber unit or bus control unit, which is not illustrated in any more detail, for the single-channel coupling of a safety-critical process to a bus 40, for example an Interbus. In the case of a bus subscriber unit, each of the processing channels is connected to input/output units, for example sensors and/or actuators, which are associated with the safety-critical process but are likewise not illustrated.

Depending on the type of specific connection, identical input data which are relevant to the safety-critical process are thus made available, on one channel or two channels of the processing channels 1 and 2, to a bus subscriber unit with an application at the sensor end, and are expediently first of all stored in memories 12 and 22 for further processing. Particularly in the case of a bus control unit, the data to be made safe, that is to say safety-relevant input data and/or output data to be preprocessed before bus transmission as described below, are located in memories 12 and 22.

First of all, before the single-channel transmission of a safety message via the bus 40, the input data and/or output data are redundantly processed, to form a respective safety-based protocol 14 and 24, using the same laws. For this purpose, the processing channels 1 and 2 comprise a respective microcontroller 11 or 21 for respective preprocessing/processing of the safety-relevant input data and/or output data located in the memory 12 or 22 to form the safety-based protocol 14 or 24. The safe protocols 14 or 24 calculated by the microcontrollers 11 and 21 can each be stored in a protocol chip which is connected downstream of the microcontroller 11 or 21 and receives the safety-based protocol 14 or 24, as calculated by the respective microcontroller 11 or 21, for further transfer to the bus 40. In an alternative embodiment, the microcontrollers 11 and 21 may also comprise appropriately designed software, so that the microcontrollers 11 and 21 themselves provide the further transfer, which will be described in the following text, of the calculated protocols 14 and 24 to the bus 40.

Consequently, provided that no errors or failures have occurred during the calculation, the calculated, safe or safety-based protocols 14 and 24 are identical. It should be pointed out that the safe protocols are in this case, of course, designed such that they satisfy the requirements in the standard for safety-based transmission.

In order to increase safety further, the invention provides for the joint formation of a further identical, common safety-based protocol before the transmission of a safe message via the bus 40, which protocol can then be transferred on one channel to the bus 40 for transmission. This common safety-based protocol is formed, with the involvement of both redundant processing channels 1 and 2 and taking into account the data of the safe protocol 14 and the data of the safe protocol 24, in a buffer memory or buffer register 30 which can be accessed by each of the processing channels 1 and 2.

In order to prevent this safety-based protocol, which is to be formed jointly, being designed by only taking into account calculated data from only one of the processing channels 1 or 2, which consequently would be equivalent to the transmission of a safety message by only one of the microcontrollers 11 or 21, for example on account of a failure having occurred in one of the two microcontrollers, a defined or definable access rule controls the writing rights to the buffer memory 30. In this respect, the access rule states that only parts of the respectively calculated safety-based protocol from each processing channel 1 and 2 can be stored in appropriate memory locations of the buffer memory 30 during writing for the formation of the joint safety-based protocol when the respective microcontroller 11 or 21 has a write authorization for the respective memory locations and the data to be written in are identical to the corresponding calculated data from the respective other processing channel. Thus, according to the invention, only one write authorization is respectively defined for each memory or register location and the data to be written are additionally verified again during writing.

This consequently realizes an extremely effective locking mechanism which, when a respective data item is being written, allows access to the buffer memory 30 for the purpose of storage in a corresponding memory location only when the data item to be written in comes from that processing channel 1 or 2 which has write authorization for this memory location and both of the safe protocols 14 and 24 which have been calculated are identical.

Figure 2:
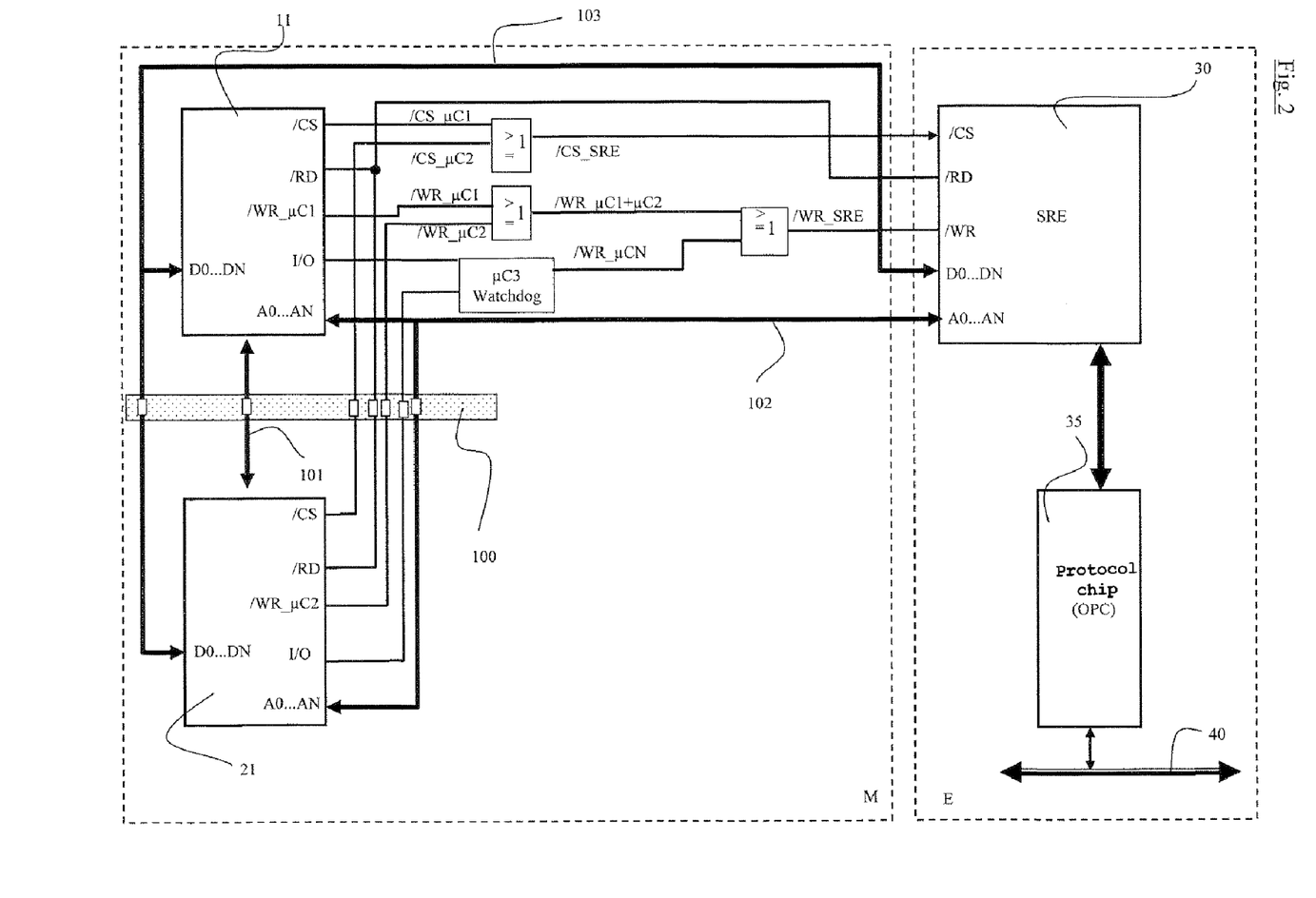
FIG. 2 shows one possible functional circuit diagram for implementation of the invention, based on two microcontrollers which each redundantly calculate the complete, safety-based protocol.

To this end, the invention preferably provides for a respective one of the microcontrollers 11, 21 to act as a master and for the respective other microcontroller to act as a slave, in which case both microcontrollers 11 and 21 are connected to the buffer memory 30 by means of a common data bus 103 and address bus 102 (FIG. 2). The master expediently determines the memory location(s) for which a respective data item or a plurality of data items is/are to be written in. In a preferred embodiment, the master also respectively determines that microcontroller which writes in the data and carries out verification while writing in said data.

If, for example as shown in FIG. 1, the microcontroller 11 is the master and the microcontroller 21 is the slave, the master 11 places the address(es) corresponding to the particular memory location(s) onto the address bus 102 (FIG. 2) and places the data item(s)—which it itself has calculated for this/these address(es)—of the safe protocol 14 onto the data bus 103 (FIG. 1) in the case illustrated. As shown in FIG. 1, the master 11 prescribes the memory addresses for the byte X+1, the byte X+2 and the byte X+3 and places its calculated bytes X+1, X+2 and X+3 onto the data bus 103. The slave 21 compares these data which have been placed onto the data bus 103 and are labeled 14' in FIG. 1 with its own self-calculated data for the applied address, as is indicated in FIG. 1 using the reference numeral 25. If the data match, the slave 21 transmits an enable signal 26 to the buffer memory 30, after which the write signal for the memory is enabled. The safe protocol element 14' is thus accepted into the memory 30 from the data bus 103 in response to the enable signal 26.

If this "verification" leads to results that are not the same, an error is inevitably identified, and a safety-based function is initiated.

In the embodiment illustrated in FIG. 1, the master 11 also optionally provides an enable signal 16 after it has placed its calculated safe protocol element onto the data bus 103. Consequently, acceptance is effected only when both enable signals are present, which results in an even further increase in safety.

In this case, the safe protocol is thus compared immediately when a data item or a plurality of data items is/are being written but before it/they is/are stored in the memory 30. Since the comparison is carried out during writing, the method according to the invention operates in a more rapid manner than previously known methods which carry out a comparison before writing or after writing by means of readback. Furthermore, this method can also be safely applied to storage media which cannot be read back, for example in SRE chips.

Complete read access to the memory is thus no longer absolutely necessary.

The invention also comprises embodiments in which the microcontrollers behave in a reciprocal manner, that is to say the microcontroller operating as the master applies the address and the microcontroller acting as the slave then places the corresponding safe data onto the data bus. The master then compares the safe data with its own self-calculated data and enables the corresponding write signal when the data match.

A cyclical change is also conceivable, in which case each of the microcontrollers alternately acts sometimes as the master and sometimes as the slave.

Furthermore, the master can also, for example, place the entire calculated safe protocol as a whole onto the data bus and can place the corresponding addresses of the memory locations onto the address bus, with the result that the slave compares the entire safe protocol which has been placed onto the data bus with its own self-calculated safe protocol as a whole.

A respective write authorization is thus preferably defined using a master/slave mechanism.

In addition to a standard RAM or standard DPM which is just sufficient, a memory which cannot be read back, for example a serial register expansion chip (SRE), can thus also be used as the buffer memory.

The buffer memory 30 can have a further interface which can be used to transfer the jointly formed safe protocol, which is stored in this memory, or the safe message, for transmission, to a protocol chip or to another intelligent unit from which, for example, the single-channel coupling to the bus 40 is effected.

FIG. 2 illustrates, by way of example but by using software as described above instead of protocol chips, one possible functional circuit diagram for implementation of the write authorization sketched in FIG. 1, as well as the comparison and enable mechanisms as the basis for inventive verification during the writing operation.

As can be seen in FIG. 2, the area which is illustrated on the left and is labeled M comprises the multichannel architecture according to the invention with a safety analysis, and the right-hand area, which is labeled E in FIG. 2, comprises the single-channel architecture with the jointly formed safety-based protocol which is to be transmitted as a safety message. The safety analysis of the redundant architecture ends with the comparison and storage of the safe messages or safe protocol in the memory 30 since, from there, the safety mechanism of the safe protocol is effective since the errors which are possible from here on are, in principle, assumed and considered to be for transmission and must consequently also be able to be controlled. An error which is considered in this respect from the principle for the testing and certification of "bus systems for the transmission of safety-relevant messages" is, for example, message corruption.

Thus, based essentially on FIG. 1, the two microprocessors 11 and 21 are decoupled in a manner known per se (labeled using the reference numeral 100 in FIG. 2) and, furthermore, are connected to one another via a communication interface 101 for additionally mutually checking the respectively separately calculated safety-based protocols 14 and 24 before data are written to the memory 30 for the purpose of jointly forming a safe protocol and/or for mutual synchronization.

The microcontrollers 11 and 21 are directly connected to the corresponding pins of the SRE chip 30 (illustrated in FIG. 2), as the memory, via a common address bus 102 for the address Ax, where x is between 0 and N, and a common data bus 103 for the data Dx, where x is between 0 and N. The SRE chip 30 has a further interface which can be used to connect a subordinate protocol chip 35, but also essentially any desired further memory, a microcontroller or the like on an application-specific basis.

In the present case, an OPC (Optical Protocol Chip) is connected as the protocol chip and is in turn coupled to the bus 40. The SRE chip 30 is consequently also used to extend the data width of the OPC protocol chip 35.

The signals /CS (chip select) from the two microcontrollers 11 and 21, which are labeled /CS_iC1 and /CS_iC2 in FIG. 2, are logically ANDed. In this case, this corresponds to an OR gate on account of the negative logic of the /CS signals. The signal /CS_SRE from the SRE can thus be activated only when the two microcontrollers 11 and 21 put their /CS signal to low.

Like the /CS signals, the write signals, that is to say the /WR signals from the two microcontrollers 11 and 21, which are labeled /WR_iC1 and /WR_iC2 in FIG. 2, are also logically ANDed, which again corresponds to an OR gate. In the example illustrated, the signal /WR_iC1+iC2 which results from the combination of /WR_iC1 and /WR_iC2 is again logically ANDed with the signal from a further microcontroller iC3, with the result that this microcontroller must also put its write signal /WR_iC3 to low before a write signal can be applied to the SRE. This may be, for example, the general and/or concluding enable using a watchdog circuit.

The /WR_SRE signal from the SRE can thus be activated only when the two microcontrollers 11 and 21 put their write signal to low and the enable from the third microcontroller iC3, which provides the watchdog circuit, is additionally present.

Consequently, the write authorization and comparison functionality defined in the present example using the master/slave division of the microcontrollers 11 and 21 can also be monitored and ensured in a simple manner, since pulses or pulse sequences which are respectively generated during writing and comparison can be reliably monitored using a microcontroller iC3 which is intermediately coupled in this manner or in a similar manner as a watchdog circuit.

If both microcontrollers 11 and 21 have each calculated their safe message, the microcontroller 11, for example, places an address onto the address bus 102 and then places the data onto the data bus 103. At the same time, it sets the /CS_iC1 signal and the /WR_iC1 signals to low. From the point of view of the microcontroller 11, this corresponds to the enable for writing the data to the memory 30. However, on the basis of the circuit shown in FIG. 2, it is not yet possible to access the memory 30 for the purpose of storing the data item(s) to be written in on account of the lack of an enable from the second microcontroller 21.

The microcontroller 21 now compares the data item or data items from the microcontroller 11 for the corresponding memory location with the corresponding self-calculated safe protocol part for this memory location. If these data are identical, the microcontroller 21 enables the /CS signal, that is to say /CS_iC2 is set to low, and then enables the /WR signal, with the result that /WR_iC2 is set to low.

If the watchdog circuit iC3 has not closed and the actual pulse sequence is thus equal to that defined, that is to say the signal /WR_iC3 is low, the data to be written in can be stored in the memory, since all enables are present and both the /CS_SRE signal and the /WR_SRE signal are each at low.

Depending on the memory chip used and defined read authorizations, it is also possible, in principle, on the basis of the exemplary embodiment illustrated in the present case when safe protocols or messages are received in the opposite direction, for a microcontroller to read a safe protocol, which is stored in the memory 30, only when said microcontroller activates its /RD signal and both microcontrollers activate their /CS signal.

The described sequence thus presupposes expected behavior and synchronization between the microcontrollers in order to be able to store a valid safe protocol in the memory 30, which is a fundamental aspect for achieving the required safety.

The functional circuit diagram illustrated in FIG. 2 can be realized just by means of a simple logic circuit but may, for example, also be realized by means of an FPGA. Furthermore, of course, it is also possible to use a simple standard RAM instead of the SRE 30 illustrated in FIG. 2. For a person skilled in the art, it is obvious that the circuit arrangement illustrated in FIG. 2 represents only one of the possible technical implementations. A write access rule and the verification mechanism during writing according to the invention can also be applied to more than only two redundant computers/processing channels. By way of example, when coupling a safety-critical process from an environment, which has more than only two channels, to a single-channel environment, more than only two redundant microcontrollers are also accordingly involved in the comparison, locking and enabling operations.

What is claimed is:

1. A method for the coupling of a safety-critical process from a safe environment, which has at least a first redundant processing channel and a second redundant processing channel, to an environment that is unsafe or to an environment that is safe but has fewer processing channels, said method comprising:

processing a data record that is relevant to the safety-critical process, using the first and second processing channels in accordance with identical laws, wherein the first processing channel forms a first redundant safe protocol and the second processing channel forms a second redundant safe protocol; and forming an additional identical common safe protocol based on the first redundant safe protocol and the second redundant safe protocol, by accessing a common buffer register, in which case a write authorization is allocated only once for each register location in the common buffer register;

wherein, when writing elements of the additional identical common safe protocol using corresponding elements of the first redundant safe protocol of the first processing channel, in which the first processing channel has the write authorization,
 i) access to the common buffer register for the purpose of storing the elements of the additional identical common safe protocol is kept locked, and
 ii) the second processing channel is used to check whether the elements of the additional identical common safe protocol are identical to corresponding elements of the second redundant safe protocol, and wherein access to the common buffer register for the purpose of storing the elements of the additional identical common safe protocol is enabled only when i) the elements of the additional identical common safe protocol to be stored and ii) corresponding elements of the second redundant safe protocol are identical to one another.

2. The method as claimed in claim 1, wherein, furthermore, the respective write authorizations and verification duties are determined by prescribing at least one of specific master functionalities and specific slave functionalities for the first and second processing channels.

3. The method as claimed in claim 2, wherein, furthermore, the at least one of specific master functionalities and specific slave functionalities for the first and second processing channels are changed in accordance with particular cycles.

4. The method as claimed in claim 1, wherein, furthermore, the same address bus, which is connected to the buffer register, and the same data bus, which is connected to the buffer register, are accessed using each of the first and second processing channels.

5. The method as claimed in claim 4, wherein, furthermore, during the write operation, the respective protocol elements that are to be written into at least one register location are transferred to the data bus using the first processing channel, which has the corresponding write authorization, and are read from said data bus using the second processing channel for the purpose of verification.

6. The method as claimed in claim 5, wherein, furthermore, after verification has been carried out, the second processing channel, which carries out verification, is used to output an enable signal for enabling the write signal for the register.

7. The method as claimed in claim 5, wherein, furthermore, after the protocol elements have been transferred to the data bus, the first processing channel is used to output an enable signal.

8. The method as claimed in claim 4, wherein, furthermore, a respective register location for writing in protocol elements using one of the first and second processing channels is prescribed by transferring the corresponding address to the address bus.

9. The method as claimed in claim 8, wherein, furthermore, an address for determining a register location is transferred using one of (i) the same processing channel and (ii) different processing channels, and protocol elements for this register location are written using one of (i) the same processing channel and (ii) different processing channels.

10. The method as claimed in claim 1, wherein, furthermore, a watchdog component that is connected between the first and second processing channels and the buffer register is used to monitor the function of the first and second processing channels.

11. The method as claimed in claim 10, wherein, furthermore, an enable signal is required from the watchdog component in order to enable access to the common buffer register for the purpose of storing elements to be written in.

12. The method as claimed in claim 11, wherein, furthermore, one of (i) a standard Random-Access Memory (RAM), (ii) a standard dual-port memory (DPM), and (iii) a memory/protocol chip that is hostile to read-back is used as the buffer register.

13. The method as claimed in claim 1, wherein, furthermore, the common safe protocol is transferred from the buffer register to an application-specific coupling device on one channel.

14. The method as claimed in claim 1, which is used for the single-channel bus coupling of the safety-critical process.

15. An apparatus for the coupling of a safety-critical process from a safe environment, which has at least two redundant processing channels, to an environment that is unsafe or to an environment that is safe but has fewer processing channels, said apparatus comprising:
a first redundant computer for processing an input data record to form a first redundant safe protocol;
a second redundant computer for processing the input data record to form a second redundant safe protocol, wherein the first and second redundant computers process the input data record using identical laws; and
a circuit arrangement for connecting each of the first and second redundant computers to a common buffer register in such a manner that for forming an additional identical common safe protocol, write access is given to only a respective computer of the first and second redundant computers for each register location in the buffer register, and
when writing elements of the first redundant safe protocol for the purpose of forming elements of the additional identical common safe protocol, the access to the common buffer register for the purpose of storing the elements to be written in is kept locked until the elements to be written in have been verified by a computer other than the respective computer, and
the access to the common buffer register for the purpose of storing the elements to be written in is enabled only when i) the elements to be written in and ii) corresponding elements of the second redundant safe protocol are identical to one another.

16. The apparatus as claimed in claim 15, wherein, furthermore, the first and second redundant computers are allocated respective write authorizations or verification duties by means of at least one of specific master functionalities and specific slave functionalities that can also be changed.

17. The apparatus as claimed in claim 15, wherein, furthermore, the circuit arrangement comprises a common address bus and a common data bus.

18. The apparatus as claimed in claim 15, wherein, furthermore, the first and second redundant computers are connected to one another using a communication interface.

19. The apparatus as claimed in claim 15, wherein, furthermore, the circuit arrangement requires an enable signal from the computer that is carrying out verification in order to enable a write signal for accessing the register.

20. The apparatus as claimed in claim 19, wherein, furthermore, the circuit arrangement requires an enable signal from the computer that is writing in order to enable a write signal for accessing the register.

21. The apparatus as claimed in claim 15, wherein, furthermore, the circuit arrangement comprises a watchdog component, which is connected to the first and second redundant computers and to the buffer register, for the purpose of monitoring the function of the first and second redundant computers.

22. The apparatus as claimed in claim 21, wherein, furthermore, access to the common buffer register for the purpose of storing elements to be written in is enabled only in response to an enable signal from the watchdog component.

23. The apparatus as claimed in claim 15, wherein, furthermore, the first and second redundant computers each comprise one of the following: (i) an integrated protocol chip; (ii) a connection, on the output side, to a protocol chip; and (iii) software that provides the function of the protocol chip.

24. The apparatus as claimed in claim 15, wherein, furthermore, the apparatus is one of: (i) a bus subscriber unit, wherein the first and second redundant computers are connected, on the input side, at least to input channels for connecting process data input units, and (ii) a bus control unit.

25. The apparatus as claimed in claim 15, wherein the circuit arrangement is based on one of: (i) simple logic and (ii) a Field Programmable Gate Array (FPGA).

26. The apparatus as claimed in claim 25, wherein, furthermore, the buffer register is one of (i) a standard Random- Access Memory (RAM), (ii) a standard dual-port memory (DPM), and (iii) a memory that is hostile to read-back.

27. The apparatus as claimed in claim 15, wherein, furthermore, the buffer register has an interface for one of: (i) the direct single-channel bus coupling and (ii) the single-channel connection to an application-specific bus coupling device.

28. The apparatus as claimed in claim 15, which has been adapted for the single-channel bus coupling of the safety-critical process.

* * * * *